United States Patent Office 3,354,038

Patented Nov. 21, 1967

1

3,354,038

SERIAL PASSAGING TISSUE CULTURED CANINE DISTEMPER VIRUS TO FORM ATTENUATED VACCINE SHORT OF VIRUS-ANTIGENICITY DECREASING PASSAGES

Edmund P. Bass, White Hall, Ill., assignor to Affiliated Laboratories Corporation, White Hall, Ill., a corporation of Illinois No Drawing. Filed Dec. 2, 1964, Ser. No. 415,487
4 Claims. (Cl. 167—78)

This application is a continuation-in-part of my copending application Ser. No. 143,065, filed Oct. 5, 1961, now abandoned.

This invention relates to vaccines and the production of vaccines, and more particularly to a novel canine distemper vaccine and process of producing such a vaccine, which is effective in immunizing canines against canine distemper virus.

Briefly, the invention relates to the process of producing attenuated vaccines for immunizing canines against canine distemper which comprises introducing an inoculum of canine distemper virus into a tissue culture medium containing viable cells of canine tissue or ferret tissue, incubating the tissue culture medium until multiplication of the virus has begun, thereafter separating an inoculum of said virus and serially passing the virus through canine cultures for at least about 10 but not more than approximately 34 passages. The invention also includes the novel vaccine produced by the process of the invention.

Among the several objects of the invention may be noted the provision of a novel vaccine which is effective in immunizing canines against canine distemper virus; the provision of such a vaccine which is attenuated to an extent that it will not produce symptoms of canine distemper when inoculated into nonimmune canines but which will stimulate an antibody response effectively immunizing the canines; and the provision of a novel method of producing such a vaccine which involves propagation of the virus on tissue cultures. Other objects and features will be in part apparent and in part pointed out hereinafter.

The invention accordingly comprises the products and methods hereinafter described, the scope of the invention being indicated in the following claims.

As is well known, canine distemper is a widespread disease which causes serious losses. Heretofore, it has been the practice to control the disease by immunizing the animals with vaccines of canine tissue or chick embryo origin. However, the use of vaccines of canine tissue or chick embryo origin has been recognized as having certain shortcomings. Thus, the injection of vaccines of such origin into dogs results in a protein reaction or bacterial infection in some dogs. Also, virus concentration is intrinsically low.

In accordance with the present invention, I have discovered a novel process for producing an attenuated vaccine effective for immunizing canines against canine distemper, which is free from foreign protein and bacterial contamination. Also, virus concentration is very high, having $TCID_{50}$ of $10^{-7}$ which can be easily measured. This process involves the propagation of canine distemper virus on tissue cultures of canine or ferret kidney cells. More particularly, I have found that Affiliated CD 60 canine distemper virus may be successfully propagated on monolayer canine kidney cells in a nontoxic fluid tissue culture medium to produce a cytopathogenic effect and then serially transferred or passed to effect attenuation of the virus.

2

After serially passing the virus on canine or ferret cells for at least about 10 passages, at an incubation temperature of approximately 38.5° C., the virus is adapted and may thereafter be further propagated and attenuated on cultivated canine or ferret tissues or on other tissue cells. After serially passing the virus for at least about 10 passages on canine tissue culture cells in media having a pH of about 8.0, a vaccine is obtained which will stimulate an antibody response upon injection into canines without producing symptoms of distemper and without spreading other viruses or bacteria.

While passing the virus for 10 passages on canine or ferret tissue culture cells under the conditions stated will attenuate the virus to the extent that it will stimulated an antibody response in canines without producing canine distemper, further passages are usually desirable. For most purposes it is preferred that at least 20 passages be carried out and virus which has been serially passed for 30 passages may be safely employed in immunizing all susceptible canines. The number of serial passages should, however, not exceed approximately 34. Otherwise it will be found that the antigenicity of the virus decreases. With the 36th passage this has occurred to the extent that the immunogenic power of the vaccine is no longer satisfactory. Additional passages beyond the 36th further reduce the antigenicity of the virus.

I have found that the production of vaccine in accordance with the method of the invention eliminates the above noted shortcomings, and also that by using the monolayer cell technique undesired viruses and bacteria can easily be detected and eliminated. Canine viruses and bacteria which may be present in the cultivated canine tissues or canine tissue cells employed in my method can be easily detected and any production lots which are contaminated can be eliminated, and therefore do not infect animals to which the vaccine of the invention is administered. The invention accordingly provides a vaccine which safely and effectively immunizes animals against canine distemper virus without exposing the animals to infection from viral and bacterial contamination and foreign proteins. Also the typical cytopathogenic effect which results in the course of the virus multiplication is an effective tool in titration and standardization of the virus and vaccine.

Essentially, my process utilizes the Dulbecco and Vogt modified method and involves incubation of a nutrient fluid tissue culture medium containing trypsin dispersed cells of canine kidney tissue until a monolayer sheet of cells is formed, replacement of the nutrient fluid tissue culture medium with a maintenance fluid tissue culture medium, of high pH, inoculation of this medium with canine distemper virus and incubation at about 38.5° C. until a cytopathogenic effect or other indication of virus multiplication is obtained. The propagation or growth of the virus in this manner is usually completed within 20 days following inoculation with the canine distemper virus. However, the incubation period can be extended for longer periods if desired. The propagated virus is then harvested, identified and titrated by the subsequently described method, to effect partial or complete attenuation of the virus.

In propagating and attenuating the virus in accordance with my invention, any nontoxic nutrient fluid tissue culture medium may be utilized. Exemplary of such a medium may be mentioned a medium containing 90% Earle's balanced salt solution, 5% lactalbumin hydrolysate, 4% horse serum, 100 units of penicillin and 0.1 mg./ml. of streptomycin. It will be understood that other nontoxic nutrient fluid tissue culture media may also be used. Exemplary maintenance fluid tissue culture media which may be used are Parker No. 199 or Eagle's medium.

The virus produced in accordance with the present invention may be diluted according to the titer or may have added thereto stabilizers or other nontoxic substances. For use as a vaccine, the virus may be desiccated or it may be prepared in liquid form.

In administering the vaccine of the invention, it will be understood that the dosage may vary depending upon the virus titer of the virus in the vaccine and its antigenic properties.

The following examples illustrate the invention:

*Example 1*

Canine distemper vaccine, modified live virus, canine tissue culture origin, was prepared in accordance with the invention utilizing the Dulbecco and Vogt modified method (Dulbecco, R., and Vogt, M., Journal of Experimental Medicine, 1954, volume 99, page 167) as follows:

Canine kidneys were used. The cortex was minced with sharp cuticle scissors and was transferred to a 250 ml. Erlenmeyer flask. It was the washed with phosphate buffered saline solution (sodium chloride 8.0 g., potassium chloride 0.2 g., sodium acid phosphate 1.15 g., monobasic potassium phosphate 0.2 g., magnesium chloride 0.1 g., calcium chloride 0.1 g., water to make 1000 ml.) until the supernatant was clear. The mixture was allowed to settle between washings. After the last washing, trypsin (100 ml. of 0.25% solution) was added and the resulting mixture was stirred on a magnetic mixer for one-half hour.

The mixture was allowed to settle and the supernatant was discarded. An additional amount of trypsin (200 ml., 0.25 solution) was next added and the mixture was stirred with a magnetic stirrer in a refrigerator at low speed overnight. After removal from the stirrer, the mixture was transferred to centrifuge bottles (250 ml.) and centrifuged for five minutes at 800 to 1000 r.p.m.

The supernatant was discarded and nutrient fluid tissue culture medium was added. This consisted of 80% Earle's balanced salt solution (phenol red 0.02 g., sodium chloride 6.8 g., potassium chloride 0.4 g., magnesium sulfate 0.21 g., sodium acid phosphate 0.14 g., sodium bicarbonate 2.2 g., glucose 1.0 g., calcium chloride 0.26 g., water to make 1000 ml.), 10% lactalbumin hydrolysate, 10% horse serum, penicillin (100 units/ml.) and streptomycin (0.1 mg./ml.). The cells were resuspended and centrifuged at 600 to 800 r.p.m. for three minutes. The supernatant was siphoned off and the cells were again resuspended and filtered through gauze.

The cells were then transferred to 50 ml. volumetric centrifuge tubes and centrifuged at 600 r.p.m. for three minutes. The cell volume was read and the cells were suspended in the tissue culture nutrient medium described above in the proportion of 1 ml. of packed cells to 250 ml. of medium. This cell suspension was then dispensed into a series of tubes and bottles in the proportions: 1 ml. of cell suspension in a test tube; 10 ml. in a 4 oz. bottle; 20 ml. in a 6 oz. bottle and 50 ml. in a 16 oz. bottle.

The containers were next placed in an incubator. After a monolayer sheet of cells was formed (2–8 days), the nutrient fluid was removed and maintenance fluid (Earle's balanced salt solution 90%, lactalbumin hydrolysate 5%, horse serum 4% plus penicillin 100 units/ml.; mycostatin 100 units/ml. and streptomycin 0.1 mg./ml.) was added. The bottles were then inoculated with canine distemper virus. Several uninoculated containers were retained as controls. All of the containers were then placed in an incubator and left there until a cytopathogenic effect had been produced on the cells in the bottles inoculated with canine distemper virus (usually on the fifth to fifteenth day). No degenerative changes occurred in the control containers.

The bottles were removed from the incubator, checked for cytopathogenic effect, and then harvested in a common container. New bottles containing a monolayer sheet of cells obtained as described above were then inoculated with the harvested virus to serially pass the virus. If desired, the virus may be stored in a frozen condition and then at some future time inoculated into bottles containing tissue cultures.

The virus is serially passed for at least 10 passages on canine cells to attenuate the virus to the extent that it will stimulate an antibody response in canines without producing symptoms of canine distemper. While virus serially passed for less than a total of 20 passages may be effective in immunizing canines against canine distemper, virus serially passed for 30 passages may be safely used in immunizing all susceptible canines.

Virus propagated as described above and serially transferred for 20 passages on canine kidney cells was successfully employed to vaccinate dogs against canine distemper. 150 dogs, susceptible to canine distemper, were employed in the test. 100 of these dogs were administered 1 ml. each, parenterally, of a vaccine containing only the virus from the 20th passage. The dogs so vaccinated did not show any symptoms of canine distemper or elevated body temperature. On the 21st day following vaccination they were challenged with a 1 ml. dose of virulent canine distemper virus. The vaccinated dogs remained well and exhibited no reaction of any kind throughout a four week observation period, while the unvaccinated controls when similarly challenged sickened and developed typical symptoms of distemper.

*Example 2*

To establish the stability of the vaccine of the present invention, samples of desiccated vaccine prepared from virus propagated as described in Example 1 and serially transferred for 20 passages on canine kidney cells, were incubated at 37° C. for 3 to 10 days and $TCID_{50}$ determined on tissue culture canine cells before and following incubation.

As appears from the table below, the titer of the vaccine showed a loss of log 0.2 and 0.3 $TCID_{50}$ following 7 days incubation and about 1.0 log $TCID_{50}$ following 10 days incubation at 37° C. This proves that the virus is stable in desiccated state and has a high margin of safety.

| Titer before incubation | 3 days | Incubation at 37° C. | |
|---|---|---|---|
| | | 7 days | 10 days |
| $10^{-5.6}$ | $10^{-5.6}$ | $10^{-5.4}$ | $10^{-4.6}$ |

*Example 3*

As shown on Table 1, 5 susceptible ferrets were inoculated with 1 cc. of vaccine prepared from virus propagated as described in Example 1, and 5 susceptible ferrets were left together with the inoculated as contact controls.

The vaccinated ferrets did not show any reaction following vaccination. 21 days later, the 5 vaccinated ferrets and 5 contact controls, together with 5 susceptible ferrets, which had been kept separate, were challenged with 1 cc. of Snyder Hill strain of canine distemper virus. Following challenge, the 5 vaccinated ferrets did not show any reaction, while the contact controls and controls kept separate showed typical symptoms of distemper and died.

Inclusion bodies were demonstrated in smears from the dead ferrets.

The same experiment was repeated using susceptible puppies (Table I). In this experiment 5 susceptible puppies were vaccinated with 2 cc. of vaccine prepared from virus propagated as described in Example 1 and 5 uninoculated contact controls were left with the vaccinates. There was no temperature raise or untoward reaction following injection. 3 weeks later the 5 vaccinates, 5 contact controls and 2 susceptible controls were challenged with distemper virus. Following challenge the 5 vaccinated puppies did not show any reaction, while the 5 contact controls and 2 controls kept separate showed typical signs of distemper. Sera from the puppies were taken before and after inoculation and tested for distemper antibodies using serum neutralization test on eggs. All sera were negative before inoculation. Sera of the contact controls and controls kept separate were negative at the time of challenge. Vaccinated puppies showed positive titer of 1-40 dilution before challenge.

This demonstrates that the vaccine of the present invention did not spread from inoculated animals to susceptible contacts.

TABLE I

| Animals | Vaccination | | Challenge | |
|---|---|---|---|---|
| | | Reaction | | Reaction |
| 5 Ferrets | Yes | No reaction | Yes | No reaction. |
| Do | No | Contact controls kept with vaccinates. | Yes | All died, inclusion bodies present. |
| Do | No | Controls kept separate. | Yes | Do. |
| 5 Puppies | Yes | No reaction | Yes | No reaction. |
| Do | No | Contact controls. | Yes | Reaction, temperature typical to distemper. |
| 2 Puppies | No | Kept separate | Yes | Do. |

Example 4

To establish a minimum protective dosage in dogs, as recorded on Table II, 7 groups of 4 susceptible puppies each were inoculated with a dose of vaccine prepared from virus propagated as described in Example 1, having a titer of $TCID_{50}$—$10^{-5.6}$, in ten fold dilutions. 3 weeks later all inoculated animals and 2 controls were challenged intravenously with virulent canine distemper virus (Snyder Hill strain). Puppies inoculated with dilutions up to $10^{-5}$ did not react, 2 puppies inoculated with dilution $10^{-5}$ reacted, 2 others did not. Control puppies, which were kept with vaccinates reacted, having high temperature and typical symptoms of distemper.

Sera of all puppies were taken and tested for distemper neutralizing antibodies, before start of the test, at the time of challenge and 6 weeks after challenge. They were all negative before injection and the vaccinates positive at 1-40 dilution at time of challenge. Two puppies at the dilution $10^{-6}$ had a titer between 1-10 and 1-40, two others about 1-10. Controls did not show any titer at the time of challenge.

This proves that about one $TCID_{50}$ produces immunity in susceptible puppies.

Example 5

Ten susceptible puppies 9-16 weeks of age were inoculated subcutaneously and 10 intravenously, with one dose each of vaccine prepared from virus propagated as described in Example 1. All were observed for clinical symptoms and temperatures were taken daily for 14 days. 4 weeks following vaccination, 5 puppies vaccinated subcutaneously and 5 intravenously, together with 2 controls, were challenged by intravenous injection, while other vaccinates, with 2 susceptible controls, were challenged by intracranial injection. Following challenge, vaccinates did not show any reaction while controls reacted.

Blood samples were taken before and after vaccination and also after challenge. Serum neutralization test showed no titer at 1-10 before vaccination and a titer of above 1-100 (1000 E.P.U. 50) 4 weeks later. Controls were negative at the time of challenge.

TABLE II

| Dilution | Dog No. | Temperature, Day Following Challenge | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Undiluted | 4 | No temperature reaction | | | | | | | | | | | |
| $10^{-1}$ | 4 | Same | | | | | | | | | | | |
| $10^{-2}$ | 4 | Same | | | | | | | | | | | |
| $10^{-3}$ | 4 | Same | | | | | | | | | | | |
| $10^{-4}$ | 4 | Same | | | | | | | | | | | |
| $10^{-5}$ | 4 | Same | | | | | | | | | | | |
| $10^{-6}$ | 44 | 1.8 | 1.0 | 1.4 | 1.8 | 1.6 | 2.6 | 1.4 | 1.2 | 1.2 | 1.4 | 1.6 | 2.0 |
| | 45 | 2.8 | 3.8 | 4.0 | 4.2 | 2.0 | 2.4 | 3.6 | 3.8 | 3.2 | 2.8 | 1.4 | 2.4 |
| | 46 | 4.0 | 4.2 | 4.6 | 4.0 | 2.8 | 2.8 | 3.6 | 5.0 | 5.2 | 3.0 | 1.8 | 2.2 |
| | 47 | 3.0 | 2.2 | 2.4 | 2.2 | 1.8 | 1.8 | 1.8 | 1.6 | 2.0 | 2.0 | 1.8 | 3.0 |
| Controls | D2 | 4.4 | 5.6 | 4.0 | 4.6 | 2.6 | 3.4 | 4.4 | 5.0 | 3.0 | 2.2 | 2.8 | 2.2 |
| | D3 | 1.8 | 4.0 | 6.0 | 3.4 | 2.4 | 2.0 | 3.2 | 4.8 | 3.4 | 2.6 | .99 | D |
| | D4 | 2.8 | 4.6 | 4.4 | 4.2 | 2.8 | 4.0 | 4.6 | 4.8 | 5.0 | 2.8 | 0.0 | D |

TABLE III

| Dog No. | Vaccination | Challenge | Reaction |
|---|---|---|---|
| 5 Puppies | Subcutaneously | Subcutaneously | No temperature or reaction. |
| Do | do | Intracranially | Do. |
| Do | Intravenously | Subcutaneously | Do. |
| Do | do | Intracranially | Do. |
| Controls: | | | |
| 70 | None | } Subcutaneously | Severe reaction and temperature. |
| 71 | None | | |
| 72 | None | } Intracranially | Sick and died on 7th and 9th day. |
| 73 | None | | |

Example 6

Virus was propagated as described in Example 1 and was serially transferred for 36 passages on canine kidney tissue culture cells. 2 ferrets were innoculated with the virus from the 36th passage diluted 1–10. Two weeks later the vaccinated ferrets together with 2 unvaccinated controls were challenged by subcutaneous injection of virulent canine distemper virus. As a result of the challenge 1 of the unvaccinated ferrets died while the other showed a temperature rise but recovered. Both unvaccinated controls died.

From the foregoing it is apparent that after 36 passages the virus has lost its antigenic power and no longer provides the protection which is secured with the virus of a smaller number of passages.

Example 7

Virus was propagated as described in Example 1 and was serially transferred for 41 passages on canine kidney tissue culture cells. 3 ferrets were inoculated with 1 cc. each of the virus from the 41st passage. At the same time 3 ferrets were left unvaccinated as controls. 2 weeks later all of the animals were challenged with a subcutaneous injection of ½ cc. of a virulent strain of canine distemper virus. Following challenge all of the vaccinated animals showed typical symptoms of distemper, 1 animal died and 2 later recovered. All 3 of the controls died with typical symptoms of canine distemper (Table IV).

The above test was repeated using young dogs instead of ferrets. 3 dogs were vaccinated with the virus from the 41st passage. 2 weeks later the inoculated animals together with 3 unvaccinated controls were challenged by intracerebral injection. As a result of the challenge 2 dogs showed typical symptoms of distemper and 1 of these died. The other vaccinated dog was unaffected. All 3 of the controls died with typical symptoms of distemper (Table IV).

The above tests indicate that by the 41st passage the virus had lost most of its immunogenic power.

the occurrence of cytopathogenic effect, and thereafter separating an inoculum of said virus and serially passing the virus through other cultures for at least about 10 but not more than about 34 passages.

2. The process of producing an attenuated vaccine for immunizing canines against canine distemper which comprises introducing an inoculum of canine distemper virus capable of producing a cytopathogenic effect into a nontoxic fluid tissue culture medium containing a growth of cells of kidney tissue selected from the group consisting of canine kidney tissue and ferret kidney tissue, incubating said tissue culture medium until multiplication of the virus has begun as characterized by the occurrence of cytopathogenic effect, and thereafter separting an inoculum of said virus and serially passing the virus through other cultures for at least about 10 but not more than about 34 passages.

3. The process of producing an attenuated vaccine for immunizing canines against canine distemper which comprises incubating a nontoxic nutrient fluid tissue culture medium containing viable cells of canine tissue selected from the group consisting of canine kidney tissue and ferret kidney tissue until a monolayer sheet of cells is formed, replacing said nutrient fluid tissue culture medium with a maintenance fluid tissue culture medium, introducing an inoculum of canine distemper virus capable of producing a cytopathogenic effect into said maintenance fluid tissue culture medium, incubating said maintenance fluid tissue culture medium until multiplication of the virus has begun as characterized by the occurrence of cytopathogenic effect, and thereafter separating an inoculum of said virus and serially passing the virus through other cultures for at least about 10 and no more than about 34 passages.

4. The process of producing an attenuated vaccine for immunizing canines against canine distemper which comprises incubating a nontoxic nutrient fluid tissue culture medium consisting of a balanced salt solution plus minor quantities of serum and antibiotics and containing viable

TABLE IV

| Animals | Date | | Results of Challenge, Days | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 |
| Ferrets | | 1 | | | | | | | | S | S | VS | S | S | N | | | |
| Vaccinated | 2/27 | 2 | | | | | | | | | S | S | S | VS | VS | D | | |
| Challenged | 3/12 | 3 | | | | | | | S | S | S | S | N | N | VS | D | | |
| Controls | | 4 | | | | | | | | S | S | S | VS | VS | VS | D | | |
| | | 5 | | | | | | | | | S | S | VS | D | | | | |
| | | 6 | | | | | | | | | S | S | S | VS | VS | VS | D | |
| Dogs | | 77 | | | | | | S | S | S | | | | | | | | |
| Vaccinated | 4/2 | 78 | | | | | | | | D | | | | | | | | |
| Challenged | 4/16 | 79 | | | | | | | | S | | | | Remained Normal | | | | |
| Controls | | 80 | | | | | | D | | | | | | | | | | |
| | | 81 | | | | | | | S | S | VS | D | | | | | | |
| | | 82 | | | | | | | S | S | D | | | | | | | |

Key: N—Normal, S—Sick, VS—Very Sick, D—Dead.

In view of the above, it will be seen that the several objects of the invention are achieved and other advantageous results attained.

As various changes could be made in the above methods and products without departing from the scope of the invention, it is intended that all matter contained in the above description shall be interpreted as illustartive and not in a limiting sense.

What is claimed is:

1. The process of producing a vaccine for immunizing canines against canine distemper which comprises introducing an inoculum of canine distemper virus capable of producing a cytopathogenic effect into a nontoxic fluid tissue control medium containing viable cells of tissue selected from the group consisting of canine tissue and ferret tissue, incubating said tissue culture medium until multiplication of the virus has begun as characterized by cells of canine kidney tissue until a monolayer sheet of cells is formed, replacing said nutrient fluid tissue culture medium with a maintenance fluid tissue culture medium, introducing an inoculum of canine distemper virus capable of producing a cytopathogenic effect into said maintenance fluid tissue culture medium until multiplication of the virus has begun, as characterized by the occurrence of cytopathogenic effect and thereafter separating an inoculum of said virus and serially passing the virus through other cultures for at least about 10 and not more than about 34 passages.

References Cited

UNITED STATES PATENTS 3,098,011  7/1963  Rockborn _____ 167—78

LEWIS GOTTS, *Primary Examiner.*

S. K. ROSE, *Assistant Examiner.*